United States Patent Office 2,739,094
Patented Mar. 20, 1956

2,739,094

REFORMABLE PLASTIC MATERIAL

George P. Schmitt, Trenton, and Bernard Jaffe, Princeton, N. J., assignors to St. Regis Paper Company, New York, N. Y., a corporation of New York No Drawing. Application February 10, 1945,
Serial No. 577,336

2 Claims. (Cl. 154—110)

This invention pertains to a laminated plastic material comprising fibrous sheets impregnated with and united, under heat and pressure by, a thermo-setting resin of such characteristics and in such state of cure, that the laminated material so formed, may be bent and reshaped, at elevated temperature, into a desired and permanent final configuration, and without delamination, cracking or other injurious effects. The invention also pertains to the resin itself and to its production, and to methods of making and subsequently reshaping the laminated plastic material made therewith.

More especially the invention pertains to a laminated plastic material made with a thermo-setting resin comprising the heat reaction product of a primary aromatic amine, such as aniline, an aliphatic aldehyde, such as formaldehyde, and a phenol, such as $C_6H_5.OH$, said resin in its preferred form, being in such a state of cure in the laminated material as initially produced, that at operating temperatures normal for such materials, it will equal or surpass the strength characteristics of thermo-setting laminates heretofore known, while at the same time possessing so-called "post formable" properties whereby the material may be further reshaped, at elevated temperature, into a desired and substantially permanently shaped, infusible and insoluble final form, having excellent flexural and tensile properties and a high strength-weight ratio.

An object of the invention is, therefore, to supply a laminated product of the phenol-aldehyde type, which may be heated and reshaped after the curing process, a laminating varnish used to make the laminated product, and a method of manufacture for said laminating varnish.

Another object of the invention is to provide a laminated structure which has post forming characteristics when heated to the proper temperature and which has a final strength equal to or greater than that of a similar structure made with usual types of phenol formaldehyde laminating varnishes.

Another object of the invention is to provide a laminating varnish having the characteristics above described, and reformable products thereof, without recourse either to special or hazardous solvents or to complicated techniques of manufacturing or processing, or to special manufacturing equipment.

"Post forming" is the term applied to the method by which thermo-setting laminated plastics may be formed or shaped after they have undergone the curing process. Briefly, the procedure used is to subject the laminate to some form of heat until the material has sufficiently softened (preheating) and then to shape it by pressure to the contours of a mold or die (forming). After the piece has cooled enough to retain its shape, it is removed from the mold.

A number of heating media are permissible; molten metal or hot oil baths, hot air ovens, high frequency dielectric heating, and infra-red lamps have all been used for this purpose. With preferred examples, the temperature of preheating may range from about 170° to 260° C., for a duration readily determined by trial, depending on the thickness, and also, to a certain extent, upon the shape to be formed. The mold may be made of hardwood, cast metal, cast resin, concrete, or even in some cases, plaster. It need not be highly polished. The pressure required varies depending upon the complexity of the form to be made, but in any event it will be low, i. e., for a typical example, of the order of about 10 to 100 pounds per square inch, depending on the thickness of the laminate and the shape to be formed.

Hitherto, the manufacture of thermo-setting laminated plastic articles in small numbers and of special shapes, has not been generally considered economically feasible, because of the high cost of the tooled steel molds required for concurrently integrating and shaping the laminate in accordance with prior practices. The provision of a plastic laminate which may be post formed, greatly reduces the unit mold costs, since the laminate may be initially produced in the form of flat sheets employing tooled steel plates suitable for that purpose and which can be used repeatedly irrespective of the final configuration of any particular piece; whereas the final shaping or post forming can be accomplished with relatively cheap molds made of wood, etc., as above noted, and which are not required to have absolutely true and polished surfaces. For the above reasons it has heretofore been impossible for laminated plastic articles to compete with corresponding metal articles, where only a small number of units are required.

By the use of post forming, however, a small number of articles of thermo-setting plastic may be produced at a price enabling them to compete with metal hand made pieces, on the usual plastics-metal price basis, in addition to providing a much greater degree of interchangeability than is possible among any group of articles made by hand. Another advantage is that the post forming die can be quickly and cheaply altered or replaced, thus facilitating changes in design. Also, certain finishing operations can be simplified, since trimming, polishing, and sanding may be carried out on the flat sheet laminate as initially produced. Finally, post forming supplies the means for manufacturing pieces which cannot be molded with simple two-piece compression molds, such as articles with dies of 0° slope or negative draft, etc.

The ordinary phenolic resins pass through a stage where they are temporarily formable before they become completely set and infusible. However, this range, which lies between insufficient curing, with resultant poor physical properties and weak interlaminar adhesion, on one hand, and complete curing, which forestalls any but the slightest bending or shaping, on the other, is so narrow that the reshaping of a laminate in such state, using ordinary resins, is extremely difficult, even under laboratory conditions, and definitely impracticable commercially.

In accordance with one aspect of the present invention, the above difficulties are overcome by the provision of the aforesaid resin of this invention, having curing properties such that the margin between the time when it is cured sufficiently to display good physical properties when cold and to avoid blistering during preheating, and the time when it is set too completely for adequate formability, is so great as to provide ample range for carrying out post forming operations. For typical examples of resins made according to the invention, the permissible temperatures of curing effected, for example during laminating, range from about 145° C. to about 165° C. and the permissible curing times from about 30 minutes to about 65 minutes.

The following are examples of methods for producing the reaction products of our invention as we now prefer to practice it. These examples are illustrative, and the invention is not to be restricted thereto except as indicated by the appended claims.

A preferred resin of the present invention may be obtained by introducing the following ingredients in the proportions specified, into a suitable reaction vessel, such as a copper still used for manufacturing ordinary phenolic resins:

| | |
|---|---|
| Aniline | About 35 parts by weight. |
| Phenol | About 65 parts by weight. |
| Formaldehyde | About 100 parts by weight of a 37.5% aqueous solution (commercial formalin). |
| Ammonia | About 3 parts by weight of a 28% aqueous solution (commercial concentrated aqua ammonia). |

The mixture is refluxed, under atmospheric conditions, for about 90 to 100 minutes, and is then dehydrated under an absolute pressure of about 250 millimeters of mercury down to as low a pressure as it is possible to attain with equipment standard for such procedure. Pressures higher than 250 mm. of mercury tend to cause excessive viscosity in the laminating "varnish" containing the resin as referred to more in detail hereinafter. Dehydration is carried out until a temperature of about 95° to 100° C. is attained.

After dehydration, the resin is immediately diluted with a suitable solvent consisting preferably of about two-thirds isopropanol and one-third toluene by volume, until the solution contains, for example, a 50 to 60% resin content. This solution termed a "varnish," is then at the concentration ordinarily employed for impregnating the fibrous sheet material used for laminating.

In place of the formalin employed above, it is to be understood that other aldehydes capable of supplying reactive methylene linkages, may be used, such for example as para-formaldehyde, trioxymethylene, etc.

The substitution for phenol of its homologues such as the cresols, xylenols, etc., also lies within the scope of this invention, although experience indicates that such materials, when used other than as minor partial substituents for phenol, tend to decrease the proportion of aniline which may be incorporated in the formulation without precipitating the resin.

Also in place of aniline, other primary aromatic amines may be employed, such as the several toluidines or mixtures of them, etc.

The ammonia is included as a catalyst. Similar results may be obtained with a smaller proportion of ammonia, but the drying of the impregnated sheets to a state suitable for the curing operation is lengthened thereby. Under neutral conditions, the resin produced requires a drying time which will ordinarily be too long to be economically feasible for most purposes. An increase in ammonia reduces the forming qualities. In place of the ammonia, certain other basic catalysts may be employed, for such example as sodium hydroxide, alkyl amines, alkylol amines, etc.

A decrease in the proportion of the aromatic amine, aniline, employed correspondingly decreases the formability; an increase impairs the solubility of the varnish at room temperature. For example, if 50% instead of 35% aniline (based on aniline plus phenol=100%) be used, the varnish must either: (1) be kept above 53° C.; or (2) be diluted with large amounts of acetone, in order to prevent the precipitation of the resin from the solution.

A reduction in the proportion of the aldehyde, such as formaldehyde, weakens the interlaminar bond, an increase hinders formability and slightly decreases the proportion of aniline which can be employed without precipitation of the resin from the solution.

By way of summarizing the above information, a broad or permissive range for the starting ingredients will be about as follows:

| | |
|---|---|
| Aniline | About 10 to 50 parts by weight. |
| Phenol | About 90 to 50 parts by weight. |
| Formaldehyde | About 95 to 155 parts by weight of a 37.5% aqueous solution (commercial formalin). |
| Ammonia | About 1 to 6 parts by weight of a 28% aqueous solution (commercial concentrated aqua ammonia). |

A preferred range of the aforesaid ingredients will be about as follows:

| | |
|---|---|
| Aniline | About 30 to 37 parts by weight. |
| Phenol | About 70 to 63 parts by weight. |
| Formaldehyde | About 95 to 115 parts by weight of a 37.5% aqueous solution (commercial formalin). |
| Ammonia | About 2½ to 3½ parts by weight of a 28% aqueous solution (commercial concentrated aqua ammonia). |

It will be noted that in the above broad and preferred ranges, the lower limit for the aniline is combined with the upper limit for the phenol and vice versa, so that the aniline content varies in substantially inverse relation to the phenol content within the limits specified. It will be further noted that for each 100 parts by weight of aniline plus phenol, there is added 95 to 155 parts by weight of formalin, i. e. about 35 to 56 parts formaldehyde, for the broad range specified, and about 95 to 115 parts formalin, i. e. about 36 to 43 parts formaldehyde for the preferred range.

Expressed in molar proportions, since the mol weights of phenol and aniline are about equal, the broad range would be equivalent to about 10 to 50 mols of the amine and about 90 to 50 mols of the phenol, with about 111 to 182 mols of aldehyde per 100 mols of the amine plus phenol. For the preferred range, the corresponding mol proportions are about 30 to 37 mols of the amine, and 70 to 63 mols of the phenol, together with about 111 to 135 mols of the aldehyde per 100 mols of the amine plus phenol.

For purposes of forming a laminated structure with the aforesaid varnish, any suitable fibrous sheet material may be impregnated therewith, viz: cellulosic sheet, i. e., paper, or cloth, for example, duck or canvas, or asbestos paper or cloth, glass cloth, glass mat, etc. The impregnation is carried out in the same manner as with ordinary phenolic resins, that is to say, by progressively feeding the material in strip form through a bath of resinous solution and squeezing off the excess by subsequent passage between squeegee rolls, followed by oven drying to vaporize and remove volatile constituents, etc.

The so impregnated and treated sheets, may be formed into a laminate by superimposing successive layers to a desired thickness, and thereupon uniting and integrating the same under combined heat and pressure, using the equipment and techniques customarily employed in the production of laminated plastics. The time and temperature of curing and the pressures employed will depend upon the number of sheets, i. e., the thickness, in the built-up laminate. Thus, for example a 1/16" laminate pressed at 150° C. and 1000 pounds per square inch will take approximately 30 minutes to cure.

In accordance with a further aspect of the invention, both the post formable and the general physical qualities of a laminate made from fibrous sheet material impregnated with the phenol-aniline-aldehyde resin varnish as aforesaid, may be enhanced by applying thereto a surface coating, comprising a thin outer layer of a straight, phenol-aldehyde resin, for example, before the sheets are stacked and integrated into the laminate under heat and pressure. For this surface coating there may be used a varnish consisting for example of the following: a phenol- or cresol-formaldehyde varnish, mole ratio 1:1.1 to 1:1.4, ammonia or caustic catalyst.

This surface coating, which is called a second layer or pass, is applied to the sheet material previously impregnated with the phenol-aniline-aldehyde resin as aforesaid, by thereafter progressively feeding the same through a second bath of the above-mentioned phenol-aldehyde varnish, squeezing off the excess and oven drying, etc., as aforesaid. This second layer may, for example, comprise in amount from about 10% to 40% of the amount of the initial impregnation.

By way of illustrating the improvement thus effected, two laminates were treated and pressed exactly alike, except that one was impregnated first with the aniline-phenol-formaldehyde resin as described above, and then coated with a straight phenolic varnish in about one-fourth the amount of the first coat; while the second laminate was treated solely with aniline-phenol-formaldehyde resin. They were found to have the following properties:

When preheated in an oil bath at 200° C., the sample without the second pass of straight phenolic resin could be bent successfully about a sharp edge (i. e., a bend with substantially a zero inside radius) to an angle of 90°, after it had been immersed for 30 seconds, and when immersed for 40 seconds, the laminate blistered. Thus a safe heating range of 10 seconds was provided. The laminate with the added layer of straight phenolic resin could likewise be successfully bent in the same test after 30 seconds, but did not blister until it had been immersed for 65 seconds, thereby providing a safe heating range of 35 seconds. Since straight phenolic resins are in themselves much less formable than the aniline-phenol-formaldehyde resin, the enhanced results from the added layer are the opposite of what would be expected. Mere addition of phenolic resin to the aniline-phenol-formaldehyde resin before impregnation does not accomplish anything comparable to what has been described above. These results, as far as is known, can be obtained only by application of the phenolic resin in a separate layer. In addition, the employment of the second coat of straight phenolic resin decreases the amount of water absorption.

Material impregnated with the improved varnish of this invention, has excellent post forming qualities when heated to the proper temperature. Because of its wide working range, the scrap or reject loss usually encountered with narrow working range post forming laminates, is almost entirely eliminated. Also, the softening which takes place when a laminate made with the improved varnish is heated, and the rehardening during cooling, both occur abruptly, over a narrow temperature range. Thus, a post formed piece will be sufficiently rigid to be removed from the mold after a very short cooling period and consequently the mold is freed for admission of a new piece very quickly. Using a water-cooled metal mold, this time of confinement in the mold has been safely reduced to as short a period as 15 seconds. The resulting product does not tend to "springback," that is, to lose part of its deformation. It will be apparent that the product ready for post forming may be made in accordance with this invention with the same equipment as heretofore used for the manufacture of plastic laminates, and that all of the materials required are such as are generally available at a reasonable cost. Also since the resin is readily soluble within a considerable range, in isopropanol-toluene mixtures, it is unnecessary to use solvents such as acetone which is highly inflammable, and, because of its high rate of evaporation, does not permit during the drying of the impregnated sheet, certain desirable reactions to take place.

While the invention has been described in detail according to various preferred and desirable ways of carrying out the same, it will be obvious to those skilled in the art after understanding the invention that changes and modifications may be made therein without departing from the spirit and scope of the invention and it is intended in the appended claims to cover all such changes and modifications.

In the appended claims, by the term "formaldehyde" is meant to include formaldehyde and its polymers which yield formaldehyde on heating, such as trioxymethylene and paraformaldehyde.

What is claimed as new and desired to be secured by Letters Patent is:

1. A postformable laminating product comprising a plurality of sheets of fibrous material impregnated with and consolidated by the resinous reaction product of a phenol selected from the group consisting of phenol, cresols, xylenols and mixtures thereof, and an amine selected from the group consisting of aniline, aromatic amines having mono-alkyl ring substituents, aromatic amines having mono-aryl ring substituents, and mixtures thereof, and an aldehyde selected from the group consisting of formaldehyde and its reversible polymers, in the proportions of about 10 to 50 mols of said amine to about 90 to 50 mols of said phenol, the amine content varying in substantially inverse relation to the phenol content within the limits aforesaid, and about 111 to 182 mols of said aldehyde per 100 mols of amine plus phenol, reacted, in an aqueous alkaline medium, with refluxing followed by distillation in vacuo until substantially all water is removed, the reaction and distillation being stopped before substantial removal of said amine and before the temperature of the mixture exceeds about 100° C., each of the so-impregnated sheets being overcoated with a phenol-aldehyde resin.

2. In the process of producing complex shaped members, the steps comprising applying to a fibrous sheet material the partial reaction product of from 10 to 50 parts by weight of an amine selected from the group consisting of aniline, aromatic amines having mono-alkyl ring substituents, aromatic amines having mono-aryl ring substituents, and mixtures thereof, 90 to 50 parts by weight of a phenol selected from the group consisting of phenol, cresols, xylenols and mixtures thereof and from 35 to 58 parts by weight of an aldehyde selected from the group consisting of formaldehyde and its reversible polymers, coating said sheet material with a thermosetting phenolic resin, superimposing a plurality of the fibrous sheets with the applied partial reaction product and the phenolic resin coating thereon, consolidating the superimposed sheets under heat and pressure into a relatively flat, fully cured, thermoset laminate, relieving the pressure and cooling the flat laminate, subsequently heating the laminate to a temperature of from about 170° C. to 260° C. and subjecting the laminate to pressure of less than 100 pounds per square inch to form it into the predetermined complex shaped member and cooling the member to retain the shape.

References Cited in the file of this patent

UNITED STATES PATENTS

| Number | Name | Date |
|---|---|---|
| 1,133,083 | Baekeland | Mar. 23, 1915 |
| 1,160,362 | Baekeland | Nov. 16, 1915 |
| 1,284,296 | Frederick | Nov. 12, 1918 |
| 1,444,959 | Dickey | Feb. 13, 1923 |
| 1,451,541 | Frederick | Apr. 10, 1923 |
| 1,873,799 | Vacher | Aug. 23, 1932 |
| 1,955,731 | Bender | Apr. 23, 1934 |
| 2,112,732 | Burmeister | Mar. 29, 1938 |
| 2,198,669 | Jenett et al. | Apr. 30, 1940 |
| 2,534,923 | Nagel et al. | Dec. 19, 1950 |